(12) United States Patent
Spatafora et al.

(10) Patent No.: US 6,283,694 B1
(45) Date of Patent: *Sep. 4, 2001

(54) METHOD AND DEVICE FOR THE ALIGNMENT OF PRODUCTS

(75) Inventors: Mario Spatafora, Bologna; Roberto Ghiotti, Calderino di Monte San Pietro, both of (IT)

(73) Assignee: Azionaria Costruzioni Macchine Automatiche A.C.M.A. S.p.A., Bologna (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,333

(22) Filed: Apr. 6, 1998

(30) Foreign Application Priority Data

Apr. 8, 1997 (IT) ................................ BO97A0201

(51) Int. Cl.[7] ..................................... B65G 47/20
(52) U.S. Cl. ......................... 414/416; 414/403; 414/627; 198/433
(58) Field of Search ................................ 901/7; 198/433, 198/428; 414/416, 403, 627

(56) References Cited

U.S. PATENT DOCUMENTS

| 3,235,057 | * | 2/1966 | Rea et al. .............................. 198/428 |
| 5,174,428 | * | 12/1992 | Durst ................................. 198/343.1 |
| 5,381,884 | | 1/1995 | Spatafora et al. . |
| 5,680,746 | * | 10/1997 | Hornisch .............................. 414/416 |

FOREIGN PATENT DOCUMENTS

| 239 547 | 9/1987 | (EP) . |
| 538 767 | 4/1993 | (EP) . |

\* cited by examiner

*Primary Examiner*—Thomas J. Brahan
(74) *Attorney, Agent, or Firm*—Pillsbury Winthrop LLP

(57) ABSTRACT

In a method for aligning products, the products, being substantially aligned in crossways rows on a first conveyor, are carried by the first conveyor in hollows made in trays through a pickup position at which the products in each row are picked up by a suction head which, while remaining parallel to itself, moves in a circular path extending partly over the first conveyor. The suction head transfers the products along a portion of its path between the pickup position and an unloading position at which the products are dropped onto a second conveyor equipped with hollows so that the products are arranged in a single line, with one product in each hollow.

8 Claims, 3 Drawing Sheets

METHOD AND DEVICE FOR THE ALIGNMENT OF PRODUCTS

BACKGROUND OF THE INVENTION

The present invention relates to a system for the alignment of products.

The present invention can be used to good advantage in the food packaging industry, in particular for the packaging of biscuits, chocolates and similar products which do not have any surface that is flat enough to allow them to assume a stable transfer position. The description which follows refers to this particular field of application but without thereby restricting the scope of the inventive concept.

Usually, the food products feed out of the production machines on a conveyor arranged in ordered lines parallel to the direction of feed of the conveyor itself and normally side by side in such a manner as to form ordered rows crossways with respect to said direction of feed.

If the shape of the food products is like that described above, it is practically impossible to arrange them on the conveyor in the manner described above and to maintain the arrangement. Therefore, products that are shaped in such a manner that they cannot maintain a stable transfer position, for example, those with polyhedral or substantially spherical or ovoid shapes, must be placed in specially made hollows, side by side in such a way as to form ordered rows. These hollows can be made directly in the conveyor or in trays which are in turn placed on the conveyor.

The conveyor is normally driven intermittently and feeds the products to an alignment device constituting an infeed device to a second conveyor, also driven intermittently, which in turn feeds a user unit normally consisting of a line for the packaging of the products themselves. When the products reach the alignment device, they stop for a defined length of time required by the alignment device itself to arrange them in a single line where previously they were arranged in two or more lines parallel to the feed direction of the conveyor.

The disadvantage of the method just described is due to the intermittent feed motion of the conveyors and, hence, the relatively low speed at which the alignment device can rearrange the products while transferring them from one conveyor to the other.

Up to the present time, use has been made of devices designed to align rectangular food products, as described in U.S. Pat. No. 5,381,884 which can be referred to for a complete description. Devices of this kind are used to pick up rectangular products, having substantially parallelepipedal shapes, from a first feed conveyor and to transfer them to a second conveyor in any position relative to the carrying surface of the second conveyor. In practice, the products can be dropped onto the second conveyor in any position.

Devices of this kind, however, have the disadvantage of being unsuitable for products whose shapes make them unstable during transfer. This is because it is difficult to achieve the precision required to drop each product exactly into the corresponding hollow made in the receiving conveyor and designed to keep it in the right position while it is being transferred.

The aim of the present invention is to provide a method to align products whose shapes make them unsuitable for stable transfer and which overcomes the disadvantages described above.

SUMMARY OF THE INVENTION

The present invention provides a method comprising the step of arranging the products on a first conveyor equipped with first means for the stable supporting and positioning of each product in such a way as to arrange the products in defined positions in a plurality of lines parallel to a first feed direction of the first conveyor, the lines being placed side by side in order to form a succession of rows of products placed crossways with respect to the first feed direction and the step of feeding the lines along a first defined path and being characterized in that it also comprises the following steps: feeding at least one transfer head along a second path extending partly over the first path, the transfer head being designed to move along the second path and position itself over at least a part of a corresponding row of products at a pickup position along the first path; activating the transfer head at the pickup position in order to pick up the products from said part of the row; transferring the products held by the transfer head along a portion of the second path between the pickup position and an unloading position; and dropping the products at the unloading position onto a second conveyor equipped with second means for the stable supporting and positioning of the products and arranged in series to receive the products; the second conveyor extending along a third path which is parallel to the position assumed by the transfer head when it reaches the unloading position; the dropping step occurring in such a way that, at the unloading position, each product is dropped into the corresponding stable support and positioning means on the second conveyor and under the unloading position at that moment.

The present invention also relates to a device for aligning products.

The invention provides a product alignment device designed to be used in conjunction with a first conveyor equipped with first means for the stable supporting and positioning of the products and on which the products themselves are arranged, positioned and ordered in a plurality of lines parallel to a first feed direction of the first conveyor; the lines being placed side by side in order to form a succession of rows of products placed crossways with respect to the first feed direction; and the first conveyor being designed to feed the lines of products lengthways along a first defined path and through a pickup position; and being characterized in that it comprises at least one transfer head; driving means to enable the transfer head to move along a second path extending partly over the first path; the transfer head being designed to move along the second path and position itself over at least a part of a corresponding row of products at a pickup position; a second conveyor equipped with second means for the stable supporting and positioning of the products, arranged in series to receive the products and extending in a second direction and along a third path forming a defined angle with the rows and through an unloading position along the second path; and means to activate the transfer head so that it can pick up a group of products from the part of the row of products that is in contact with the transfer head itself and to deactivate it so that it can drop the products onto the second conveyor at the unloading position; the transfer head, when it reaches the unloading position, being oriented in the same way as the second conveyor and being equipped with means to hold the products already arranged in the right manner to be dropped into the stable support and positioning means on the second conveyor and under the unloading position at that moment.

BRIEF DESCRIPTION OF THE DRAWINGS

The invention will now be described with reference to the accompanying drawings which illustrate a preferred embodiment of the invention and in which.

DESCRIPTION OF THE PREFERRED EMBODIMENTS

Figure 1:
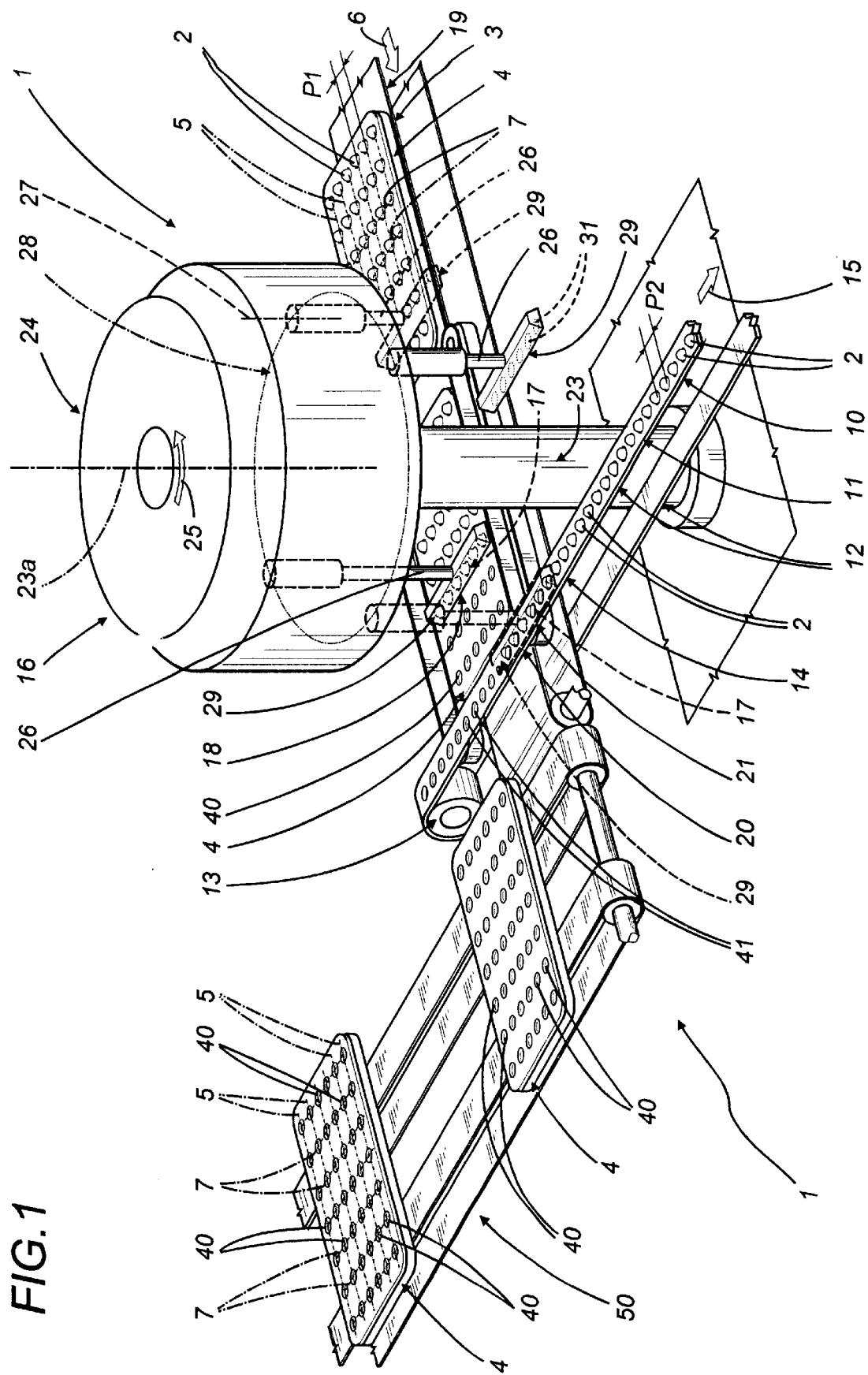
FIG. 1 is a schematic perspective view of a preferred embodiment of the device made in accordance with the invention.

With reference to FIG. 1, the numeral 1 indicates as a whole a device for the alignment of products 2 shaped in such a way that they do not have any surface that is flat enough to allow them to assume a stable transfer position. The device is connected to a first conveyor 3 for feeding the products 2 to a packaging line 11.

In this particular instance, the products 2 are chocolates or biscuits with a substantially spherical shape. The products 2 could also be ovoid or polyhedral in shape. In the rest of this description, the products 2 will be referred to as "chocolates".

Figure 2:
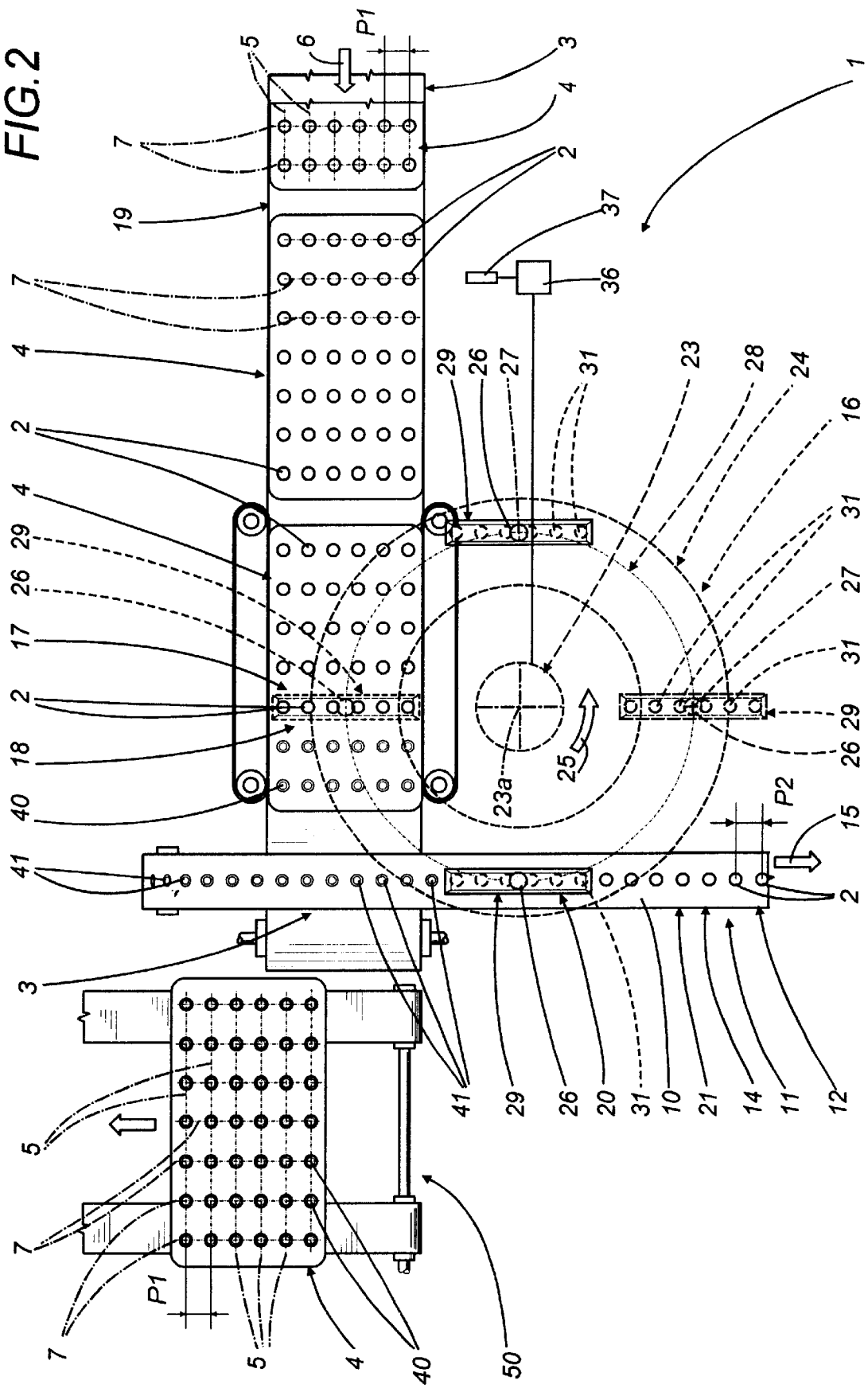
FIG. 2 is a plan view of the device illustrated in FIG. 1.

The conveyor 3 is a belt conveyor which extends through a production line of chocolates 2 and is equipped with first supporting and positioning means 4, 40 shaped in such a way as to partially contain the chocolates 2 so as to enable them to be transferred in a stable position by the first conveyor 3. As shown in FIGS. 1 and 2, the first support and positioning means consist of a plurality of trays 4, equipped with hollows 40, inside which the chocolates 2 are placed. The trays 4 are supported by the conveyor 3 which carries them in a direction 6 corresponding to the feed direction of the conveyor 3 itself.

The hollows 40 are arranged in a plurality of lines 5 spaced at regular intervals across the trays 4 and parallel to the feed direction 6 of the conveyor 3.

As shown in FIGS. 1 and 2, each chocolate 2 in each line 5 is lined up with a corresponding chocolate 2 in each of the other lines 5 and forms, with these other chocolates 2, a row 7 extending across the conveyor 3 in a direction perpendicular to the feed direction 6. The chocolates 2 in each row 7 are therefore arranged in such a way that there is a defined spacing P1 between each chocolate 2 and the chocolates adjacent to it.

The device 1 comprises a second conveyor 10, perpendicular to the conveyor 3, which constitutes an infeed conveyor to a packaging line 11. The conveyor 10 comprises a belt 12, closed in loop round two pulleys 13, only one of which is illustrated and at least one motor-driven. The belt 12 has a conveying section 14 which moves in a direction 15 perpendicular to the direction 6 and extends over the conveyor 3 in a substantially horizontal plane parallel to the plane of the conveyor 3 itself. The belt 12 is equipped with second stable support and positioning means 41 consisting of a plurality of hollows 41 designed to receive and retain the chocolates 2 and arranged one after the other in such a way that the spacing, labelled P2, between each hollow 41 and the adjacent hollows is constant and equal to the spacing P1 between the chocolates 2 in the hollows 40 on the trays 4.

The device 1 also comprises at least one pickup device 16 designed to pick up successive groups 17 of chocolates 2 when these reach a pickup position 18 along a feed path 19 of the chocolates 2 on the conveyor 3, and to transfer the groups 17 to the conveyor 10 at an unloading position 20 located along a feed path 21 of the chocolates 2 on the conveyor 10.

As shown in FIGS. 1 and 2, each group 17 includes a plurality of chocolates 2—six in this particular case—lined up in a row 7. The device 16 comprises drive means consisting of a motor-driven carousel 24 which rotates about an axis 23a in a counterclockwise direction labelled 25 in FIGS. 1 and 2.

The carousel 24 is a carousel of known kind, with a plurality of vertical protruding rods 26, each of which is connected to the carousel 24 itself in such a way as to move axially according to a law defined by a cam-operated device (of known kind and not illustrated) built into the carousel 24 and to rotate about its own axis 27 in the direction opposite that the carousel but at the same angular speed. In this way, when the carousel 24 rotates, the rods 26 move along a circular path 28, around the upright 23, partly over the conveyor 3 at the pickup position 18 and partly over the conveyor 10 at the unloading position 20. In the embodiment illustrated in FIGS. 1 and 2, the carousel 24 has two vertical rods 26 located diametrically opposite each other.

The lower end of each rod 26 mounts a transfer head 29 designed to move on its rod 26 along the path 28, while remaining parallel with itself and perpendicular to the lines 5, and at a defined speed relative to the conveyor 3.

The carousel 24 and the conveyor 3 are synchronized with each other so that each head 29, on reaching the pickup position 18 along the path 28, is over a row 7 and advances at the same speed as the conveyor 3. The carousel 24 is also synchronized with the conveyor 10 so that each head 29, on reaching the unloading position 20 along the path 28, is over the hollows 41 and advances at the same speed as the second conveyor 10.

In FIG. 1, the transfer head 29 at the pickup position 18 is drawn with a continuous line, whilst the same head 29, when it has moved to the unloading position 20 over the second conveyor 10, is drawn with a dashed line.

In FIG. 2, on the other hand, the transfer head 29 at the pickup position is drawn with a dashed line whilst the same head 29, when it has moved to the unloading position 20, is drawn with a continuous line.

Figure 3:
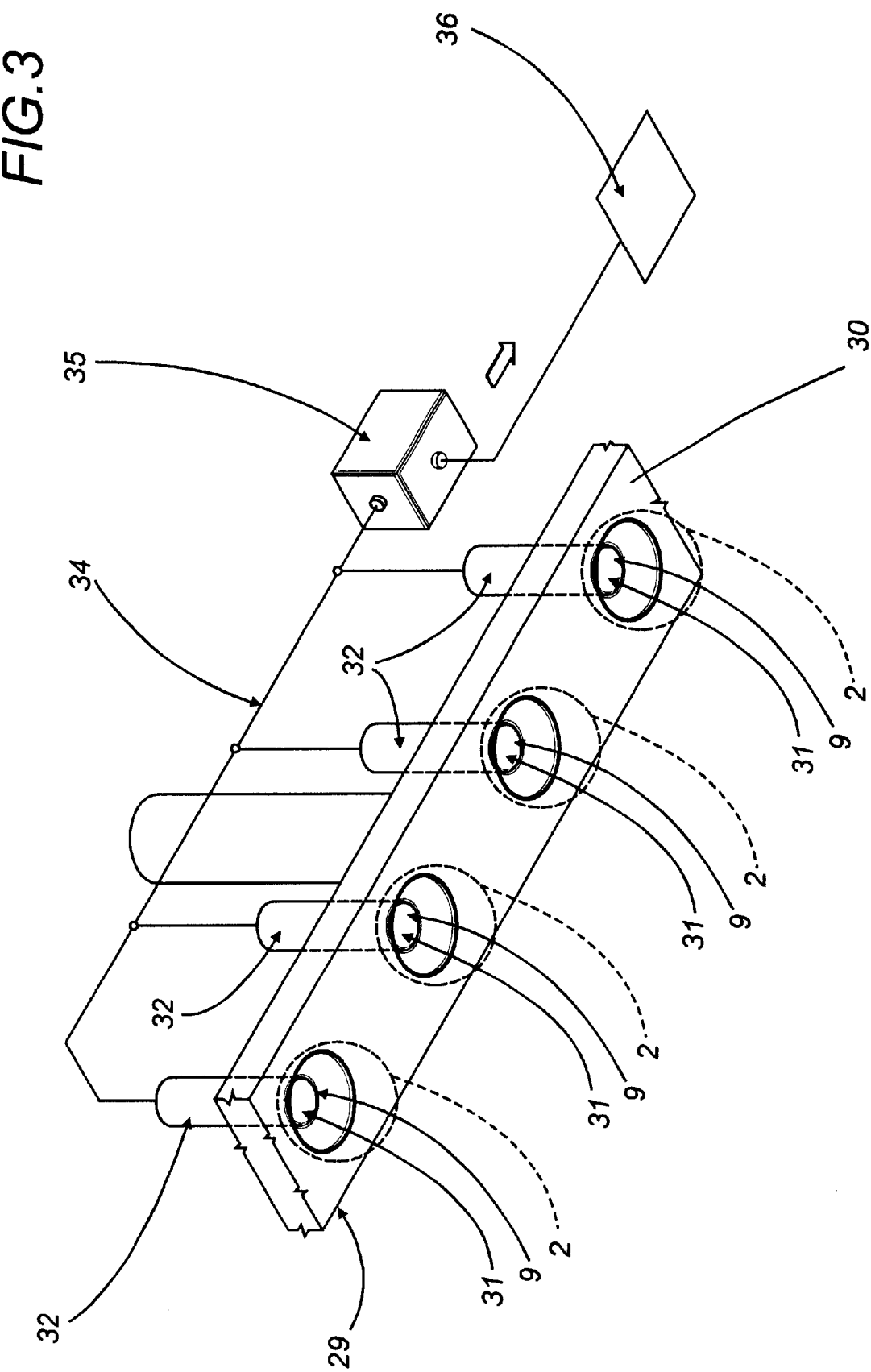
FIG. 3 is a perspective view of a detail of the device illustrated in FIG. 1.

As shown in FIG. 3, each head 29 is a suction head and comprises a plate 30 which, when it reaches the pickup position 18, extends over the lines 5 of chocolates 2, spanning a certain number of them, in this particular case, six. Each plate 30 has pickup means 9, 31 which are shaped and arranged in such a way that, at the unloading position 20, each product 2 is dropped into the corresponding hollow 41 in the second conveyor 10 at the unloading position 20.

The pickup means 9, 31 consist of a number of countersinks 9 made in through suction holes 31 which communicate, via corresponding ducts 32, with a suction circuit 34 equipped with a valve 35 controlled, through a known time-delay device 36, by sensor 37 (FIG. 2) designed to detect the position of the rows 7 on the trays 4 and synchronize the carousel 24 with the conveyor 3 in the manner described above.

The valve 35 is controlled by the sensor 37 in such a way as to switch on suction through the related holes 31 when the head 29 passes through the pickup position 18 and to switch off suction through the related holes 31 when the head 29 passes through the unloading position 20, that is to say, when the head 29 has moved along the path 28 through an angle of approximately 90°.

The through holes 31 constitute single pickup means designed to pick up and hold single products 2 and being positioned in such a way that, each time the head 29 reaches the unloading position 20, the pickup axis of each hole 31 substantially coincides with the axis of a corresponding hollow 41 in the second conveyor 10. Hence, the reciprocal positions occupied by the products 2 arranged lengthways in the hollows 41 in the conveyor 10 are the same as the reciprocal positions occupied by the products 2 arranged crossways in the rows 7 at the pickup position 18.

The operation of the device 1 will now be described with reference to the embodiment illustrated in the accompanying drawings.

With reference to FIG. 2, when a row 7 of chocolates 2 passes in front of the corresponding sensor 37, located along the path 19, a signal is issued to adjust the speed of the carousel 24 so that, when the row 7 passes through the pickup position 18, a head 29 also passes through the pickup position 18 at a speed V1 equal to the speed V2 of the tray 4 and the axis of each hole 31 coincides with the axis of the corresponding hollow 40 containing a chocolate 2. The time-delay device 37 controls the signal issued by the sensor 37 in known manner so as to open the valve 35 when the head 29 passes through the pickup position 18, thus enabling the head 29 to form a group 17 by using the action of the vacuum to pick up all the chocolates 2 making up a row 7 in the feed direction 6 of the conveyor 3. At the same time as the suction is switched on, the head 29 moves vertically under the action of known mechanical controls (not illustrated) which first move it towards the hollows 40 containing the chocolates 2 and then away from the hollows 40, now empty, while keeping the speed V1 equal to the speed V2.

The group 17 picked up is kept parallel to itself as it is moved along the path 28 to reach the unloading position 20 and so that, at the unloading position 20, the axes of the holes 31 coincide with the axes of the corresponding hollows 41 at the unloading position 20. At this point, the valve 35 is closed in known manner by the time-delay device 36 and the group 17 is thus allowed to drop onto the conveyor 10 in such a way as to form, with the groups 17 previously dropped onto the conveyor 10, a single line of chocolates which is parallel to the rows 7 and is fed by the conveyor 10 in the direction 15 at a speed V3 that is greater than the speed V2. Hence, the lines 5 are combined into one, without the chocolates 2 coming into contact with each other, and the single line of chocolates is fed to the packaging line 11.

It is important to note that the speed V1 of the head 29 at the pickup position 18 must be such as to allow the holes 31 to be correctly positioned to pick up the chocolates 2. Similarly, at the unloading position 20, the head 29 moves at a speed V4 equal to the speed V3 of the second conveyor 10, so that the chocolates 2 are dropped into the hollows 41 in the conveyor 10, one after the other, to form a single line. In this way, the chocolates 2 are arranged in the corresponding hollows 41 in the second conveyor 10 in reciprocal positions such that the spacing P2 between each chocolate 2 and those adjacent to it is equal to the spacing P1 between the same chocolates 2 when they are arranged in the rows 7 in the corresponding hollows 40 in the tray 4 on the first conveyor 3.

At the same time as the suction is switched off, the head 29 moves vertically under the action of said known mechanical controls which first move it towards the hollows 41 in the conveyor 10 and then away from the hollows 41, now containing chocolates, while keeping the speed V4 of the head 29 equal to the speed V3 of the conveyor 10.

The trays 4 are fed through the pickup position 18 until they are completely empty and they are then diverted by a conveyor 50 which carries them to a collection station of known type (not illustrated).

What is claimed is:

1. A method for the alignment of unstable products that do not have any surface flat enough to allow the products to assume a stable transfer position, the method comprising the steps of:

arranging the products on a first conveyor equipped with first means for the stable supporting and positioning of the products in defined positions in a plurality of lines parallel to a first feed direction of the first conveyor, the lines being placed side by side in order to form a succession of rows of products placed crossways with respect to the first feed direction, wherein each row contains more than one product that is spaced from an adjacent product by a predetermined spacing;

feeding the lines along a first defined linear path at a first continuous speed, feeding at least one transfer head along a second circular path extending partly over the first path, wherein the transfer head, when moving along the second circular path, is oriented, at a pickup position along the first linear path, transversely to said firs linear path to overlap at least a part of at least one said rows of products at said pickup position;

activating the transfer head at the pickup position in order to pick up the row of products upward onto said transfer head, wherein when the transfer head nears the pickup position along the second circular path, it moves at substantially the speed of the first conveyor;

transferring the row of products held by the transfer head along a portion of the second circular path extending between the pickup position and an unloading position; and dropping the row of products held by the transfer head at the unloading position onto second stable support and positioning means on a second convener which moves at a second continuous speed along a third linear path which is parallel to the position assumed by the transfer head at the unloading position;

wherein the transfer head is advanced along the second circular path at a speed substantially equal to the second continuous speed, and the transfer head drops the row of held products adjacent to the row of products dropped in the previous dropping step so that the products are dropped onto the second stable support and positioning means arranged in a continuous line such that an end product of one row of products is spaced from an end product of another row of products a distance equal to the predetermined spacing, wherein said second continuous speed is greater than said first continuous speed.

2. The method according to claim 1 wherein the product dropping step at the unloading position occurs in such a manner that reciprocal positions occupied by the products arranged lengthways on the second stable support and positioning means are the same as reciprocal positions occupied by the products arranged crossways in the rows at the pickup position.

3. A device for the alignment of unstable products that do not have any surface flat enough to allow the products to assume a stable transfer position, the device comprising:

a first conveyor equipped with first means for the stable supporting and positioning of the products in defined positions in a plurality of lines parallel to a first linear feed direction of the first conveyor;

the lines being placed side by side in order to form a succession of rows of products placed crossways with respect to the first linear feed direction, wherein adjacent products have a predetermined spacing therebetween; and the first conveyor being designed to feed the lines of products at a first continuous speed along a first linear path and through a pickup position;

at least one transfer head;

drive means for moving the transfer head along a second circular path extending partly over the first linear path, the transfer head being constructed and arranged so that when moving along the second circular path it is oriented at said pickup position transversely to said first linear path to overlap at least a corresponding and determined part of at least one of said rows;

a second conveyor equipped with second means for the stable supporting and positioning of each product, the second conveyor moving at a second continuous speed along a third linear path extending through an unloading position along the second circular path, wherein said second continuous speed is greater than said first continuous speed; and means for activating the transfer head at the pickup position so that the transfer head can pick up a row of the products and for deactivating the transfer head at the unloading position so that it can drop the row of products onto the second conveyor; the transfer head being constructed and arranged so that when it reaches the unloading position, it is oriented in the same way as the second conveyor, wherein the drive means for moving the transfer head moves the transfer head along the second circular path at a speed substantially the same as the second continuous speed, the transfer head constructed and arranged for dropping the row of held products onto the second means for the stable supporting and positioning the row of products adjacent to a dropped row of products preceding it so that the products are dropped onto the second stable supporting and positioning means in a continuous line such that an end product of one row of products is spaced from an end product of another row of products a distance equal to the predetermined spacing, wherein the transfer head, when it is near the pickup position, moves at a speed that is substantially the same as the first continuous speed.

4. The device according to claim 3 wherein the transfer head has, for each product to be picked up at one time, individual means designed and arranged to pick up and hold single products and being positioned in such a way that, when the transfer head reaches the unloading position, a pickup axis of each of said means substantially coincides with an axis of the corresponding second stable support and positioning means on the second conveyor, so that reciprocal positions occupied by the products arranged lengthways in the stable support and positioning means on the conveyor are the same as reciprocal positions occupied by the same products arranged crossways in the rows at the pickup position.

5. The device according to claim 3 wherein the products in each row are reciprocally positioned in such a way that a spacing P1 between each product and the products adjacent to it is the same as a spacing P2 between the same products once they have been placed on the second conveyor.

6. The device according to claim 3 wherein the second stable support and positioning means including a plurality of hollows made in the second conveyor and designed to hold the products.

7. The device according to claim 3, comprising at least one pickup device connected to the first conveyor and in turn comprising a carousel which can rotate about an axis thereof perpendicular to the rows and lines; the carousel mounting a plurality of protruding rods uniformly distributed round the axis of rotation, and each rod being equipped with one of the transfer heads and connected to the carousel so that it moves with the carousel along the second path while keeping the transfer head parallel with itself and with the rows at all times.

8. The device according to claim 3, wherein the transfer head is a suction head.

* * * * *